Dec. 21, 1954     E. C. RANEY     2,697,555
AUTOMATIC TEMPERATURE CONTROL SYSTEM FOR VEHICLE BODIES
Filed April 5, 1952

INVENTOR.
ESTEL C. RANEY
BY Hudson, Doughton,
Williams, David & Hoffmann
ATTORNEYS United States Patent Office 2,697,555
Patented Dec. 21, 1954

2,697,555

AUTOMATIC TEMPERATURE CONTROL SYSTEM FOR VEHICLE BODIES

Estel C. Raney, Delaware, Ohio, assignor to Ranco Incorporated, Columbus, Ohio, a corporation of Ohio Application April 5, 1952, Serial No. 280,709

2 Claims. (Cl. 237—8)

The present invention relates to temperature control systems and more particularly to a system for automatically controlling the temperature inside a vehicle body, such as the passenger compartment of an automobile.

The primary object of the present invention is to provide a system for automatically regulating the air temperature inside a vehicle body, such as the passenger compartment of an automobile, so that the lower the temperature of the walls of the body is below a comfortable temperature at the initiation of a heating period for the body, for example, the higher will be the heat input into the air inside the body, whereby sufficient heat is initially supplied to quickly raise the temperature of the structural members of the body and at the same time maintain a comfortable temperature of the air in the interior of the body, after which, as the temperature of the body structure rises, the heat input into the air inside the body is reduced to that required to maintain a predetermined comfortable air temperature.

A more specific object of the invention is to provide a system for regulating the air temperature inside a vehicle body into which air from the exterior thereof, referred to as atmospheric air, is directed after passing in heat exchange relation with a heat exchanger adapted to have a heat exchange fluid passed therethrough, which system comprises a control device to regulate the passage of the heat exchange medium through the heat exchanger, a thermally responsive element to actuate the control device and including an expansible element having a closed tube in communication with the interior thereof and containing a liquid which expands and contracts with increases and decreases in temperature thereof, a portion of the tube containing the liquid being exposed solely to air temperature inside the body and a portion thereof being in direct heat exchange relation with a heat conducting member on the interior of the body and which member is in close heat exchange relation with a portion of the body wall having the outer surface exposed to air at substantially atmospheric temperature, whereby the temperature of the heat conducting member is influenced by temperatures of both the interior and exterior of the body and which lags in changes in these temperatures.

Figure 1:
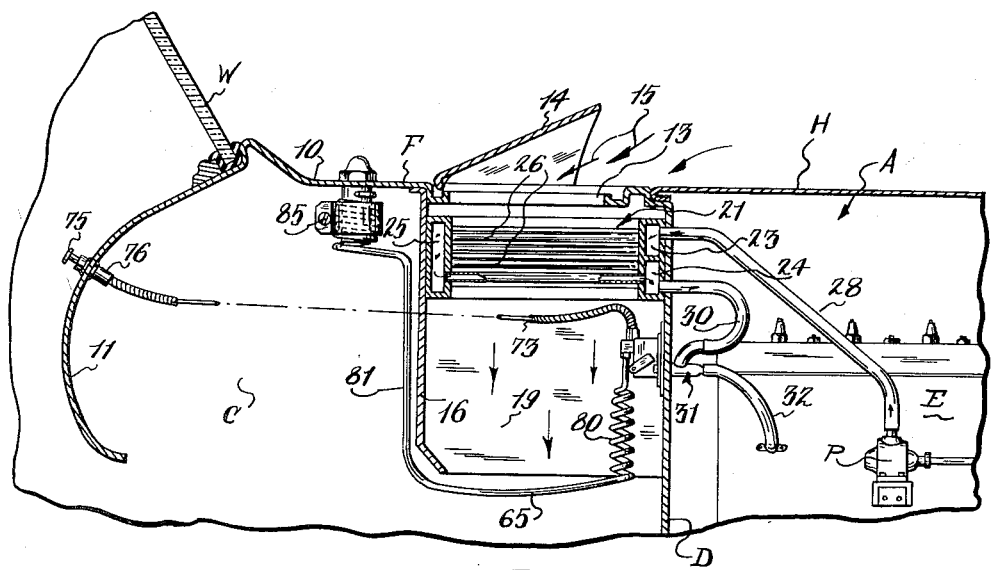
Figure 2:
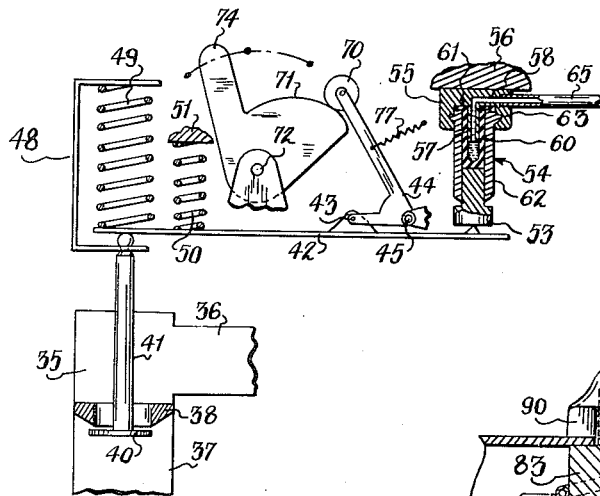
Figure 3:
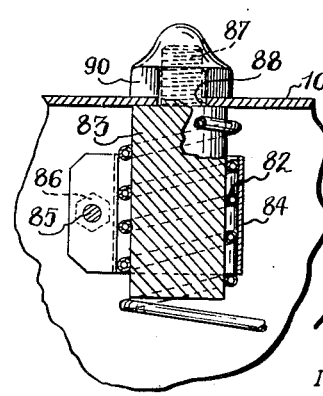

Other objects and advantages of the invention will be apparent from the following description of the preferred form of the invention, reference being made to the accompanying drawing wherein, Fig. 1 is a fragmentary sectional view of a passenger automobile embodying the invention;

Fig. 2 is a schematic illustration of a valve for controlling the flow of a heat exchange medium through a heat exchanger of the heating system for the automobile shown in Fig. 1; and, Fig. 3 is a fragmentary view partly in section and on a larger scale of the automobile shown in Fig. 1.

The invention may be employed to regulate or control the air temperature inside vehicle bodies of various types, and in its preferred form it is employed to regulate the heat input into the passenger compartment of an automobile during periods when the atmospheric temperature is below 70° F., or thereabout. To illustrate the preferred form of the invention, an automobile A is shown, which may be of conventional construction including a liquid cooled internal combustion engine E in a compartment in the forward end of the automobile and covered by a hood H. A passenger compartment C is separated from the engine compartment by a dashboard or fire wall D, and the compartment is a conventional closable type having sheet metal walls attached to metal framework and having glass windows and doors. Since such compartments are well known, only a part of the details is shown, including the cowl F which is formed by a relatively thin metal wall 10 supported by a suitable frame, not shown, and joined with the dashboard D. An instrument panel 11 extends transversely of and adjacent to the forward part of the compartment C, and a windshield W extends from the wall 10 adjacent to the panel 11 upwardly to the top wall of the passenger compartment, not shown.

The wall 10 of the cowl F has a centrally located rectangular opening 13, and an air deflector 14 is provided above the opening and comprises an inverted scoop shaped member disposed at an angle to catch and direct air downwardly through the opening as the automobile moves forwardly, as is indicated by the arrows 15.

A downwardly extending U-shaped wall structure 16 is attached to the underside of the wall 10 and the dashboard D, and the structure 16 cooperates with the dashboard D to form a downwardly extending chute 19 which terminates somewhat above the floor of the compartment, which is not shown.

A suitable heat exchanger 21 is located in the chute 19 so that all of the air directed downwardly through the chute passes in heat exchange relation therewith. The heat exchanger may be of any suitable construction, but in the form shown it comprises upper and lower headers 23, 24 at one side of the chute and a single header 25 at the opposite side. The headers are interconnected as shown by a series of tubes 26 which are closely spaced and over which the air passes as it moves downwardly through the chute. If desired, the tubes 26 may have radiating surfaces, such as fins, attached thereto to expedite heat transfer to the air. Coolant from the engine E, which is heated by operation of the engine, is circulated through the heat exchanger 21 by a pump P which withdraws the coolant from the engine block and directs it through a tube 28 into the header 23. The coolant flows from the header 23 through the tubes 26 connected therewith to the header 25 and from header 25 to header 24 through the tubes 26 interconnecting the latter headers. The coolant entering header 24 is returned to the engine by way of a tube 30 to a thermostatically controlled valve 31 from whence it flows to the engine through a tube 32.

The thermostatically controlled valve 31 is similar to that described and claimed in my copending application Serial No. 273,082, filed February 23, 1952, although other suitable valve constructions could be employed. Suffice to say, the control valve 31 comprises a suitable housing having a valve chamber 35 attached thereto and which chamber is formed of two connected tubular members 36, 37 which provide the inlet and outlet for the valve. A valve seat 38 is secured in the member 37 and is adapted to be closed by a valve plate 40 attached to a valve stem 41 which projects through an opening in a cap over one end of the member 37 and into the housing. A suitable flexible seal, not shown, is provided between the valve stem 41 and the walls of the member 37, as is disclosed in my aforesaid application. The valve stem 41 is moved longitudinally to open and close the valve 40 against its seat by a lever 42 which is pivoted at 43 to a bell crank member 44 in turn pivoted to a fixed support at 45 in the housing. The stem 41 is resiliently connected with one end of the lever 42 by a C-shaped member 48 and a compression spring 49 interposed between the lever and one arm of the member. The lever 42 is normally urged counterclockwise about its pivot by a compression spring 50 having one end abutting a fixed support 51 and the opposite end abutting the lever.

The right hand end of lever 42 is urged against a reciprocable plunger 53 of a thermal responsive element 54, which element is similar to that described and claimed in my copending application Serial No. 269,075, filed January 30, 1952. Briefly, the element comprises an inverted cup shape base member 55 attached to a wall of the housing and having a central, depending hollow stem 57 which extends slightly beyond the rim thereof. A hollow cylindrical elastic member 60 surrounds the stem 57 and has a flange 61 which engages the inner wall of the cup shape member 55 and is tightly compressed thereagainst by a rigid sleeve 62, one end of which is flanged and compresses the flange 61 of the member 60 to the member 55. The rim portion of the cup shape member 55 is turned over against the flanged end portion of the sleeve and secures it against the flange 61 of the elastic member 60. The plunger 53 is adapted to reciprocate in the sleeve 62 and it abuts the closed end of the elastic member 60.

The interior of the stem 57 is in communication with a cross bore 58 in the member 55 and one end of a small diameter flexible metal tube 65 is sealingly attached to the inside walls of the cross bore 58 and the other end of the tube is closed. The tube 65, bore 58, stem 57 and the interior of the elastic member 60 are filled with a suitable liquid which expands and contracts according to increase and decrease in temperature thereof, thereby shifting the plunger 53 in the sleeve 62 according to temperature changes of the tube. The lever 42 is accordingly moved about its pivot to vary the position of the valve plate 40 with respect to its seat.

The position of the pivot 43 for the lever 42 may be selectively adjusted to cause predetermined variation in the temperatures of the tube 65 or the degree of expansion of the elastic member 60 required to open or close the valve 40, and this is accomplished by shifting the bell crank lever 44. The tension of the spring 50 tending to pivot lever 42 on the plunger 53, urges the bell crank lever 44 counterclockwise and the upper end thereof is provided with a roller 70 which rides on a cam 71 which is shaped to cause swinging of the bell crank lever as the cam is oscillated about its pivot 72. The cam 71 may be positioned about its pivot manually by a Bowden wire 73 one end of which is attached to an arm 74 on the cam, and the other end of which has a hand grasp 75 supported by a suitable bushing 76 fixed in an opening through the instrument panel 11. Preferably, to reduce the pressure of the roller against the cam 71 and thereby minimize the manual effort required to position the cam 71, a counteracting tension spring 77 is attached to the bell crank lever 44, tending to urge the lever clockwise.

The tube 65 preferably has a portion 80 thereof coiled and disposed in the stream of air emerging from the heat exchanger 21, a portion 81 outside the chute 19 and subjected principally to the temperature in the passenger compartment, and the outer end portion thereof is coiled, as indicated at 82, and wound in a helix about a solid, metallic cylindrical member 83. Preferably, the convolutions of the coil are tightly held to the member 83 by a suitable clamp 84, which comprises a C-shaped sheet metal member having the ends thereof drawn together by a bolt 85 and nut 86 threaded on the bolt. The tube lengths forming the portions 80, 81, 82 are approximately equal in length, although the lengths may be varied according to different conditions and locations with respect to the heat exchanger, etc.

The member 83 has a threaded stem 87 thereon which projects through an opening 88 through the body wall 10, and the annular shoulder portion thereof at the base of the stem 87 is tightly drawn to the inner side of the wall 10 by a nut 90 threaded on the stem and engaging the exterior of the body wall. Thus, the member 83 is subjected to the air temperature inside the body of the automobile and is also in heat exchange relation with the body wall 10. The mass of the member 83 is such that it tends to maintain the coil portion 82 of the tube 65 at a temperature corresponding to the temperature of the body wall 10, and during warm up periods, its temperature increase lags with reference to increase in the air temperature within the compartment C. As a result, assuming that the temperature of the atmosphere is considerably below 70° F. and the air inside the compartment is approximately that of the atmosphere, the temperature of the liquid within the tube 65 will be such that the valve will be in its open position and the heating medium, which is the coolant from the engine E, will pass freely through the heat exchanger thereby heating the exchanger and the air entering the compartment through the chute 19. The temperature of the air passing over the portion 80 of the tube 65 will tend to cause the valve to reduce the flow of heating medium, but such tendency is not material since the portions 81 and 83 of the tube will initially be considerably below the temperature desired in the compartment. Continued operation of the heating system as described warms up the air throughout the compartment C and the volume of liquid in the portion 81 of the tube 65 tends to expand causing a reduction in flow of heating medium through the control valve 31. It will be noted however that the plug 83 will maintain the portion 82 of the tube below the temperature of the portion 81 thereof until such time as it absorbs sufficient heat from the air within the compartment C to permit the portion 82 of the tube to become relatively close to the temperature of the tube portion 81, at which time the valve 31 will be controlled principally according to the air temperature in the compartment C.

The volume or mass of the plug 83 is such that it maintains the portion 82 of the tube 65 relatively cool until the walls of the compartment C have absorbed heat to such an extent that the heat losses from the air in the compartment to the body structure are materially reduced so that a lower heat input into the compartment provides a comfortable temperature.

It will be noted that by placing the plug 83 in direct heat exchange relation with the wall 10 of the compartment, the temperature of the plug corresponds to the heat losses through the walls of the body and thereby causes the thermal responsive element 54 to actuate the control valve to compensate for severe heat losses due to extremely low temperatures and furnish sufficient heat to prevent uncomfortable temperatures at the outer portions of the passenger compartment.

Although the plug 83 is shown attached to the top wall of the compartment C, it is to be understood that it could be attached to the interior side of any suitable wall of the compartment having the opposite side subjected to substantially unheated atmospheric air.

It will be seen that the invention provides a heating system which automatically increases the heat input into the compartment being warmed proportional to the heat requirements to bring and maintain the walls of the compartment to a temperature which establishes a temperature comfortable to the occupants of the compartment.

Although but one form of the invention has been described it is to be understood that other forms, modifications and adaptations could be employed all of which fall within the scope of the following claims.

Having thus described my invention, I claim:

1. In a system for controlling the temperature of the interior of a vehicle body into which air from the exterior thereof is directed through a heat exchanger and including a heat exchanger arranged to effect heat exchange with air passing to the interior of the vehicle body, means to pass a heat exchange medium through said heat exchanger, a control device for regulating the flow of heat exchange medium through said heat exchanger, a thermally responsive element to actuate said control device, said element including an expansible member having an elongated closed tube in communication with the interior thereof and containing a liquid which expands and contracts in response to increases and decreases in temperature thereof, the combination of a metal body disposed in the interior of the vehicle body, means to connect one end of said metal body in direct heat exchange contact with the inside surface of a portion of a wall of the vehicle body having the outer surface thereof exposed to atmospheric air unaffected by said heat exchanger, and means to secure a section of said tube in direct heat exchange relation with said metal body.

2. In a system for controlling the temperature of the interior of a vehicle body into which air from the exterior thereof is directed through a heat exchanger and including a heat exchanger arranged to effect heat exchange with air passing to the interior of the vehicle body, means to pass a heat exchange fluid through said heat exchanger, a control device for regulating the flow of heat exchange medium through said heat exchanger, a thermally responsive element to actuate said control device, said element including an expansible member having an elongated closed tube in communications with the interior thereof and containing a liquid which expands and contracts in response to increases and decreases in temperature thereof, the combination of a cylindrical metal body in the interior of the vehicle body and having a threaded neck portion thereof projecting through an opening in a wall of the vehicle body having the outer surface thereof exposed to atmospheric air unaffected by said heat exchanger, a nut threaded on said neck and engaging the outer side of said wall, a section of said metal tube wound on said body, and a clamp securing said portion of said tube to said metal body.

References Cited in the file of this patent

UNITED STATES PATENTS

| Number | Name | Date |
|---|---|---|
| 2,213,018 | Perkins | Aug. 27, 1940 |
| 2,222,159 | Taylor | Nov. 19, 1940 |
| 2,490,919 | Raney | Dec. 13, 1949 |
| 2,518,277 | Brewer | Aug. 8, 1950 |

FOREIGN PATENTS

| Number | Country | Date |
|---|---|---|
| 313,916 | Great Britain | Sept. 1, 1930 |